Aug. 7, 1928.
A. MELDRUM
VEHICLE WHEEL
Filed Oct. 26, 1926
1,680,160
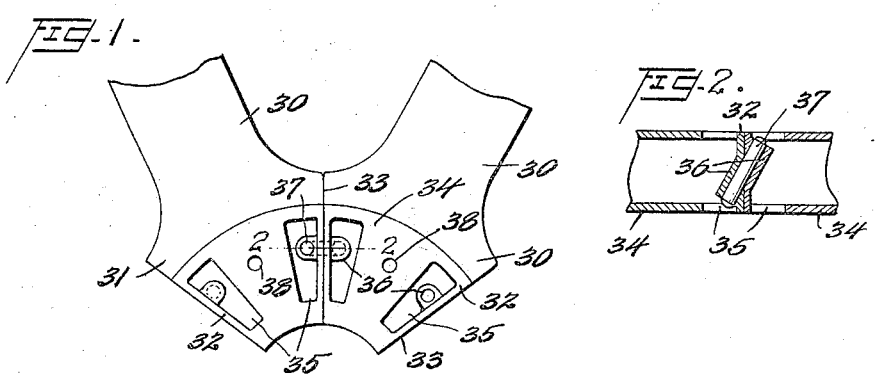
INVENTOR.
Alexander Meldrum
BY
Watson, Coit, Morse & Grindle
ATTORNEY.

Patented Aug. 7, 1928.

1,680,160

UNITED STATES PATENT OFFICE.

ALEXANDER MELDRUM, OF SYRACUSE, NEW YORK, ASSIGNOR TO MELDRUM-GABRIELSON CORPORATION, OF SYRACUSE, NEW YORK, A CORPORATION OF NEW YORK.

VEHICLE WHEEL.

Application filed October 26, 1926. Serial No. 144,351.

This invention relates to vehicle wheels and more particularly to methods of and means for securing together the hub ends of spokes.

It is a general object of the present invention to provide novel and improved methods of and means for securing the inner ends of wheel spokes together to form a hub structure.

More particularly it is an object of the invention to provide novel means for securing the sector-like inner ends of a plurality of spokes together to form a hollow hub structure, the securing means insuring against relative radial movement of any of the spokes.

Other and further objects of the invention will be more apparent to those skilled in the art upon a consideration of the accompanying drawings and following specification wherein are disclosed several exemplary embodiments of the invention with the understanding, however, that various changes may be made therein such as fall within the scope of the appended claims without departing from the spirit of the invention.

In said drawings:

Fig. 1 is a fragmentary side elevation of the hub portion of a wheel showing two spokes secured together;

Fig. 2 is a section on line 2—2 of Fig. 1.

In the manufacture of spoked vehicle wheels, and particularly wheels having individual metal spokes and a metal felloe to which the outer ends of the spokes are attached, it is highly desirable to provide some means for securing the inner ends of the spokes together in order that a plurality of spokes may be first assembled into a spider and the felloe suitably shrunk or contracted over the ends of the spokes. The means for securing the spokes together at their inner ends must be capable of preventing relative radial movement of the spokes in order to insure absolute roundness of the finished wheel.

Referring to the drawings, there will be seen a pair of spokes 30 radially disposed and having the inner sector-like ends 31, a plurality of which, when abutting along the substantially radial meeting faces or planes 33, form a complete annular hub. The outer faces 34 of the spokes are substantially flat and parallel to each other, although this configuration is not necessary. Preferably the spokes 10 are formed of cast metal, and are hollow, although solid spokes may be used.

The completed wheel is adapted to have applied over the outside face of the inner ends of the spokes a cover plate (not shown) and preferably on the inside face a flange to which the bearing sleeve or the like is attached, and for the purpose of the passage of the attaching bolts for these parts, each sector-like end is suitably perforated as shown at 38. The cover plate and flange, when tightly bolted to the wheel, prevent any relative longitudinal movement of the spokes and ring.

If the sectors are hollow, they may be provided with flat plates 32 along their meeting faces 33, the edges of which plates are exposed on the faces 34 of the spokes by means of the cut-out portions 35. Each of the plates 32 carries a boss 36 as best shown in Fig. 2. This boss projects toward the hollow of the spoke and at an angle so that its axis projects outwardly through one of the cut outs 35 at the inner end and substantially through the transverse center of the plate 32 at the outer side so that when two spokes are assembled their bosses are positioned opposite each other as shown in Fig. 2. They may be drilled so that the holes in the two parts are coextensive and thus when two spokes are positioned together a pin 37 may be driven through the two bosses to securely lock the pair of spokes together against relative radial movement. It will be noticed that the pin lies in a plane which is at right angles to the meeting plane of the faces 33 and also lies at an angle to that plane, of substantially 30°. The pins can be driven or withdrawn through the openings 35. The hub discs serve to prevent accidental displacement of the pins 37.

From the above it will be seen that a novel method has been disclosed for rigidly securing together the inner or hub ends of metal spokes whereby they are accurately positioned in relation to each other and prevented from having any relative radial movement which would serve to distort the felloe and prevent true roundness. This method and means acts to maintain in tight engagement the abutting faces of each pair of spokes.

Having thus described the invention, what is claimed as new and desired to be secured by Letters Patent is:

1. In a wheel, in combination, a plurality of radially disposed spokes each having a sector-like inner end forming a part of a hub, said ends each abutting two adjacent ends along meeting faces, and means passing diagonally through said faces to lock the spokes together.

2. In a wheel, in combination, a pair of radially disposed spokes each having a sector-like inner end abutting the adjacent spoke substantially along a radial plane, and a pin passing partially through each of said spoke ends and diagonally to said plane for the purpose described.

3. In a wheel, in combination, a pair of radially disposed spokes each having a sector-like inner end abutting the adjacent spoke substantially along a radial plane, each spoke having substantially flat outer faces, and a pin passing from one outer face of one spoke to the opposite outer face of the other.

4. In a wheel, in combination, a pair of radially disposed spokes each having a sector-like inner end abutting the adjacent spoke substantially along a radial plane, each spoke having substantially flat outer faces, and a pin passing from one outer face of one spoke to the opposite outer face of the other, said pin having its axis lying in a plane substantially at right angles to the radial plane.

5. In a wheel, in combination, a pair of radially disposed spokes each having a hollow sector-like inner end, each sector-like inner end being defined by two substantially radial walls, the lateral edges of which are partially free, the radial walls of adjacent spokes abutting each other and each being provided with an integral boss and a pin passing through the bosses of adjacent walls at an angle to the meeting plane of the abutting walls.

In testimony whereof I hereunto affix my signature.

ALEXANDER MELDRUM.